United States Patent
Moller Andersen et al.

(10) Patent No.: US 10,088,079 B2
(45) Date of Patent: Oct. 2, 2018

(54) ASSEMBLY OF A FLEXIBLE PIPE AND AN END-FITTING

(71) Applicant: National Oilwell Varco Denmark I/S, Brondby (DK)

(72) Inventors: Bo Asp Moller Andersen, Stenlose (DK); Niels Juul, Herlev (DK)

(73) Assignee: NATIONAL OILWELL VARCO DENMARK I/S, Brondby (DK)

( * ) Notice: Subject to any disclaimer, the term of this patent is extended or adjusted under 35 U.S.C. 154(b) by 24 days.

(21) Appl. No.: 14/787,833

(22) PCT Filed: Apr. 28, 2014

(86) PCT No.: PCT/DK2014/050112
§ 371 (c)(1),
(2) Date: Oct. 29, 2015

(87) PCT Pub. No.: WO2014/177152
PCT Pub. Date: Nov. 6, 2014

(65) Prior Publication Data
US 2016/0097471 A1    Apr. 7, 2016

(30) Foreign Application Priority Data

May 2, 2013   (DK) .................................. 2013 70245

(51) Int. Cl.
| | |
|---|---|
| *F16L 11/08* | (2006.01) |
| *F16L 33/01* | (2006.01) |
| *G02B 6/44* | (2006.01) |

(52) U.S. Cl.
CPC ............... *F16L 11/08* (2013.01); *F16L 33/01* (2013.01); *G02B 6/4429* (2013.01)

(58) Field of Classification Search
CPC ......... E21B 47/01; F16L 11/02; F16L 11/083; F16L 11/12; F16L 33/01; G01L 1/242; Y10T 29/49769
(Continued)

(56) References Cited

U.S. PATENT DOCUMENTS

| | | | | |
|---|---|---|---|---|
| 6,004,639 | A | * | 12/1999 | Quigley ................ B29C 70/086 138/125 |
| 6,273,142 | B1 | | 8/2001 | Braad |

(Continued)

FOREIGN PATENT DOCUMENTS

| | | |
|---|---|---|
| EP | 1 407 243 | 4/2004 |
| EP | 2 065 551 A2 | 6/2009 |

(Continued)

OTHER PUBLICATIONS

"Recommended Practice for Flexible Pipe" ANSI/API Recommended Practice 17B, Fourth Edition, Jul. 2008.
(Continued)

*Primary Examiner* — Craig Schneider
*Assistant Examiner* — David Deal
(74) *Attorney, Agent, or Firm* — Pearne & Gordon LLP

(57) ABSTRACT

An assembly is described. A flexible pipe of the assembly comprises at least one optical fiber for mounting to a processing system or another waveguide. The unbonded flexible pipe comprises a plurality of layers. The optical fiber is arranged outside an innermost sealing sheath. At least an outermost armor layer is terminated and secured by securing material in a housing cavity of an end-fitting. The end-fitting comprises a fiber exit cavity with an entrance end and an exit opening through which the fiber can exit and the fiber is applied in an overlength in said fiber exit cavity. The assembly makes it very simple and effective to connect an optical fiber of an unbonded flexible pipe via an end-fitting (Continued)

to a processing system which can operate with the fiber to pump light into the fiber and collect signals and analyze the collected signals.

20 Claims, 8 Drawing Sheets

(58) Field of Classification Search
USPC ........ 138/103, 104, 108, 109, 137, 140, 153
See application file for complete search history.

(56) References Cited

U.S. PATENT DOCUMENTS

| | | | |
|---|---|---|---|
| 8,220,129 | B2 | 7/2012 | Eccleston |
| 2006/0180305 | A1* | 8/2006 | Gambier ................ E21B 47/01 166/250.01 |
| 2010/0025985 | A1 | 2/2010 | De Aquino |
| 2012/0222770 | A1 | 9/2012 | Kristiansen et al. |
| 2013/0192707 | A1* | 8/2013 | Graham .............. E21B 47/0006 138/109 |
| 2013/0299237 | A1* | 11/2013 | Johnson ................ E21B 17/028 175/40 |
| 2015/0059904 | A1* | 3/2015 | Nokkentved ......... F16L 11/088 138/104 |

FOREIGN PATENT DOCUMENTS

| | | | |
|---|---|---|---|
| EP | 2 270 379 | A1 | 1/2011 |
| FR | 2 714 708 | A1 | 7/1995 |
| GB | 2 443 832 | A | 5/2008 |
| GB | 2485832 | A | 5/2012 |
| WO | 99/19656 | A1 | 4/1999 |
| WO | 02/088659 | A2 | 11/2002 |
| WO | 2010/055324 | A1 | 5/2010 |
| WO | 2011/042023 | A1 | 4/2011 |
| WO | 2012/059729 | A1 | 5/2012 |
| WO | 2013/135244 | A1 | 9/2013 |

OTHER PUBLICATIONS

"Specification for Unbonded Flexible Pipe" ANSI/API Specification 17J, Third Edition, Jul. 2008.
Search Report issued in Danish Patent Application No. PA 2013 70245 dated Nov. 27, 2013.
Extended European Search Report dated Nov. 2, 2016 for EP 14791578.

* cited by examiner

ASSEMBLY OF A FLEXIBLE PIPE AND AN END-FITTING

TECHNICAL FIELD

The present invention relates to a an assembly of an unbonded flexible pipe and an end-fitting, where the flexible pipe comprises a plurality of layers and is suitable for offshore and subsea transportation of fluids like hydrocarbons, $CO_2$, water and mixtures hereof. In particular the flexible pipe is a riser pipe of the unbonded type.

BACKGROUND ART

Unbonded flexible pipes as well as end-fitting therefore and assemblies thereof are well known in the art and are for example described in "Recommended Practice for Flexible Pipe", ANSI/API 17 B, fourth Edition, July 2008, and the standard "Specification for Unbonded Flexible Pipe", ANSI/API 17J, Third edition, July 2008.

Such pipes usually comprise an inner liner also often called an inner sealing sheath or an inner sheath, which is the innermost sealing sheath and which forms a barrier against the outflow of the fluid which is conveyed in the bore of the pipe, and one or more armoring layers. Often the pipe further comprises an outer protection layer which provides mechanical protection of the armor layers. The outer protection layer may be a sealing layer sealing against ingress of sea water. In certain unbonded flexible pipes one or more intermediate sealing layers are arranged between armor layers.

In this text the term "unbonded" means that at least two of the layers including the armoring layers and polymer layers are not bonded to each other. In practice the known pipe normally comprises at least two armoring layers located outside the inner sealing sheath and optionally an armor structure located inside the inner sealing sheath normally referred to as a carcass.

The armoring layers usually comprise or consist of one or more helically wound elongated armoring elements, where the individual armor layers are not bonded to each other directly or indirectly via other layers along the pipe. Thereby the pipe becomes bendable and sufficiently flexible to roll up for transportation.

The end-fitting is usually coupled to the unbonded flexible pipe to terminate at least an outermost armor layer. In most situations the end-fitting is coupled to the unbonded flexible pipe to terminate all of the layers of the unbonded flexible pipe. The end-fitting is normally relatively stiff since the coupling between the unbonded flexible pipe and the end-fitting must be strong.

Due to the stress to which the unbonded flexible pipe is subjected during use—in particular when used as a riser—several attempts have been made for incorporating sensor elements into the pipe for monitoring the condition of the pipe. Examples of methods for incorporating sensors in the form of optical fibers into an unbonded flexible pipe are described in EP1407243, EP 2 065 551 and WO 12/059729.

When mounting the unbonded flexible pipe at its use site the optical fiber should be connected to a processing system which can operate with the fiber to pump light into the fiber and collect signals and analyze the collected signals. The connection of the fiber to the processing system has shown to be very complicated and often results in a poor quality of the sensor.

DISCLOSURE OF INVENTION

The object of the invention is to provide an assembly comprising an unbonded flexible pipe comprising an optical fiber and an end-fitting which is suited for providing a high quality connection to a processing system.

This object has been achieved by the present invention as defined in the claims.

It has been found that the invention and embodiments thereof have a number of additional advantages which will be clear to the skilled person from the following description.

It should be emphasized that the term "comprises/comprising" when used herein is to be interpreted as an open term, i.e. it should be taken to specify the presence of specifically stated feature(s), such as element(s), unit(s), integer(s), step(s) component(s) and combination(s) thereof, but does not preclude the presence or addition of one or more other stated features.

The term "substantially" should herein be taken to mean that ordinary product variances and tolerances are comprised.

The term "in radial direction" means a direction from the axis of the pipe and radially outwards.

The terms "inside" and "outside" a layer of the pipe are used to designate the relative distance to the axis of the pipe, such that "inside a layer" means the area encircled by the layer, i.e. with a shorter axial distance than the layer, and "outside a layer" means the area not encircled by the layer and not contained by the layer, i.e. with a shorter axial distance than the layer.

The term "inner side" of a layer is the side of the layer facing the axis of the pipe. The term "outer side" of a layer is the side of the layer facing away from the axis of the pipe.

The terms "bend stiffener" and "bend restrictors" are used herein with the definition according to the above identified API publications API 17B and API 17J.

The term "riser" is herein used to designate a transportation line with a generally vertical orientation e.g. a pipe riser for transportation of fluid or a cable riser for transportation of electricity, signals and similar. An umbilical is usually a riser of the cable comprising several elements i.e. of cable type riser and/or pipe type riser.

All features of the inventions including ranges and preferred ranges can be combined in various ways within the scope of the invention, unless there are specific reasons for not combining such features.

The assembly of the invention comprises an unbonded flexible pipe and an end-fitting. The flexible pipe comprises at least one optical fiber for mounting to a processing system or another waveguide. The unbonded flexible pipe comprises a plurality of layers including at least an innermost sealing sheath and an outermost armor layer. The at least one optical fiber can be arranged within any layer of the unbonded flexible pipe and/or between any layers of the unbonded flexible pipe provided that it is arranged outside the innermost sealing sheath. The innermost sealing sheath should advantageously be fully intact.

At least the outermost armor layer of the unbonded flexible pipe is terminated and secured by securing material in a housing cavity of the end-fitting. The end-fitting comprises a fiber exit cavity with an entrance end and an exit opening through which the fiber can exit, the fiber is applied in an overlength in the fiber exit cavity.

The phrase "that the optical fiber is applied in an overlength in the exit cavity" means herein that the optical fiber has a length section in the exit cavity which is longer than the length from the entrance end to the exit opening of the exit cavity.

The term "overlength" used about the optical fiber in the exit cavity accordingly means that the optical fiber section in the exit cavity is longer than the length from the entrance end to the exit opening of the exit cavity. The overlength of the fiber is determined as the length of the fiber section in the cavity exceeding the minimum length from the entrance end to the exit opening.

The assembly of the invention makes it very simple and effective to connect an optical fiber of an unbonded flexible pipe via an end-fitting to a processing system which can operate with the fiber to pump light into the fiber and collect signals and analyze the collected signals. The assembly thereby is suited for providing a high quality connection to a processing system. It has been found that the assembly not only is very simple to use, it further ensures a reduced risk of damaging the optical fiber during the connection process.

The unbonded flexible pipe will usually be transported from its production site to its point of use with an end-fitting mounted to one of its ends or end-fittings mounted to each of its ends. According to the present invention the assembly is prepared for coupling the optical fiber to the processing system in a simple and economically feasible way, with a low risk of damaging the optical fiber and a low amount of labor.

The unbonded flexible pipe of the invention can be any kind of unbonded flexible pipe e.g. as described in "Recommended Practice for Flexible Pipe", ANSI/API 17 B, fourth Edition, July 2008, and the standard "Specification for Unbonded Flexible Pipe", ANSI/API 17J, Third edition, July 2008.

The end-fitting of the assembly can be any kind of end-fitting adapted for terminating at least the outermost armor layer of the unbonded flexible pipe by securing material in a housing cavity of the end-fitting, which end-fitting is further provided with a fiber exit cavity having an entrance end and an exit opening through which the fiber can exit.

Examples of end-fittings are the end-fittings described in "Recommended Practice for Flexible Pipe", ANSI/API 17 B, fourth Edition, July 2008, and the standard "Specification for Unbonded Flexible Pipe", ANSI/API 17J, Third edition, July 2008, in U.S. Pat. No. 6,273,142 or in U.S. Pat. No. 8,220,129, which end-fittings each are further provided with a fiber exit cavity having an entrance end and an exit opening through which the fiber can exit. The end-fitting advantageously comprises an annular end-fitting body structure with a mounting flange arranged distally to the housing cavity for mounting the unbonded flexible pipe to another pipe, to an installation, such as a sea surface installation (e.g. a floating installation) or a subsea installation (e.g. a production site).

The exit opening is the opening through which the fiber can exit. As it will be described in the following, the fiber can be arranged to permanently exit the exit cavity via the exit opening, while being held in a position to ensure the overlength within the exit cavity.

The entrance end of the exit cavity is the end of the exit cavity opposite to the exit opening.

The exit cavity is advantageously connected to the housing cavity e.g. by having its entrance end arranged within the housing cavity or in connection to the housing cavity. Alternatively the exit cavity is passing through the housing cavity e.g. by a tube arranged in the housing cavity.

The processing system can be any kind of processing system for an optical fiber, advantageously a processing system which can operate with the fiber to pump light into the fiber and collect signals and analyze the collected signals. Such processing systems are well known in the art and will not be described in further details herein.

The 'another waveguide' can be another optical fiber e.g. an optical fiber of another pipe to which the unbonded flexible pipe is to be connected.

In the following the assembly is mainly described with a fiber for being connected to a processing system, but it should be understood that the optical fiber could as well be arranged for being coupled to another waveguide.

In an embodiment the optical fiber is terminated in the fiber exit cavity. This solution ensures a good protection of the fiber and the fiber end during transportation of the assembly. Unbonded flexible pipes are usually relative large e.g. with diameters of 5 cm or larger and often the unbonded flexible pipe is very long such as from about 50 meters to several kilometers. The end-fitting is usually mainly of metal and such an end-fittings is very heavy. This means that the transportation of the assembly requires high power transportation systems which potentially can result in damage of more sensitive elements outside the pipe and end-fitting.

In an embodiment the optical fiber has a fiber end arranged in the exit cavity.

In an embodiment the fiber end arranged in the exit cavity is a free fiber end suitable for being mounted to a connector or for being spliced with another waveguide, such as another optical fiber. This embodiment is advantageous in situations where it is not known to which fiber-connecting type the fiber end is to be connected. In that way, the fiber end can be spliced to any desired fiber end or fiber-connector type using ordinary splicing equipment e.g. after a pretreatment of the fiber end. For example a collimator or other light manipulating equipment may be connected to the fiber end and/or a light manipulating element, such as a lens, may be applied in light connection with the optical fiber. In an embodiment the optical fiber is mounted in a ferrule which is connected to a lens e.g. a spherical lens to provide an expanded beam connection for low sensitivity to contaminants and for improved reliability in harsh environment. Such arrangement further allows easy cleaning.

In an embodiment the optical fiber has a fiber end which is mounted to a connector. Thereby the connector with the fiber end can in a simple manner be connected to the processing system. For mechanical protection the connector is advantageously applied loosely in the exit cavity. Thereby the connector will be mechanically protected during transportation of the assembly.

In an embodiment the optical fiber extends out of the exit cavity via the exit opening, the optical fiber is at least temporally fixed to have the overlength in the cavity.

In an embodiment wherein the optical fiber extends out of the exit cavity via the exit opening, the optical fiber has a free fiber end suitable for being mounted to a connector or for being spliced with another waveguide, such as another optical fiber. In this embodiment the free fiber end is advantageously covered by a protection cover in order to keep the fiber end clean and undamaged.

The optical fiber can for example be temporally fixed within the exit cavity. In an embodiment the optical fiber is temporally fixed to a lid covering the exit opening.

In an embodiment the optical fiber has a fiber end mounted to a connector. The connector can advantageously be loosely applied in the exit cavity. In an embodiment the connector is temporally fixed in the exit cavity to allow simple withdrawing there from when the connector is to be connected to the processing system.

In an embodiment the end-fitting comprises a lid which partly or fully covers the exit opening thereby protecting the exit cavity from dust and dirt. Preferably—for optimal protection against dust and dirt—the lid fully covers the exit opening or the lid covers the exit opening with the exception of a fiber hole through which the optical fiber or a connector mounted to the optical fiber is passing.

Advantageously the optical fiber or a connector connected to the optical fiber is at least temporally connected to the lid.

In an embodiment the optical fiber has a fiber end mounted to a connector and the connector is connected to the lid. Preferably at least the connector is removable from the lid when the connector is to be connected to the processing system. Alternatively the connector is removable with part or all of the lid when the connector is to be connected to the processing system.

The connector may be connected to the lid by any lock means. In an embodiment the connector is connected to the lid by a releasable lock, such as a screw lock or a snap lock.

In an embodiment where the lid covers the exit opening with the exception of a fiber hole through which the optical fiber is passing, the optical fiber has a fiber end outside the exit cavity. Advantageously the fiber end is mounted to the connector and the connector is releasably connected to the lid. The connector can for example be arranged and connected in a concavity formed in the lid for at least partly mechanical protection during transportation of the assembly.

In an embodiment where the lid covers the exit opening with the exception of a fiber hole through which a connector mounted to the optical fiber is passing, the connector is releasably connected to the lid such that in a simple way it can be released for being mounted to the processing system. Prior to being released from the lid, the connector advantageously forms at least a part of the lid.

In an embodiment the connector is shaped such that it constitutes the lid or at least forms an integrated connector-lid part.

For withdrawing the fiber optionally connected to the connector it is in an embodiment advantageously that the lid is partly or fully removable.

Advantageously the optical fiber has an overlength in the exit cavity which is sufficiently long to withdraw a section of the optical fiber from the exit cavity for mounting it to the processing system without tear in the fiber which potentially and likely results in damaging of the fiber. It should be understood that such optical fiber normally is very sensitive and, even where the optical fiber is not broken, undesired tear and/or overbending of the optical fiber may result in a very poor resolution of determinations performed afterwards using the optical fiber. In other words, poor handling of the optical fiber may damage the optical fiber without such damage being physically visible. The assembly of the present invention ensures a very low risk of damaging the optical fiber, and after a few instructions even workers without special knowledge within optics can perform the connection of the optical fiber to the processing system.

In an embodiment the optical fiber has an overlength in the exit cavity which is at least about 5 cm, such as at least about 10 cm, such as at least about 30 cm, such as at least about 1 m. The desired size of the overlength depends largely on the diameter of the unbonded flexible pipe and the distance to the processing system or the waveguide to which the optical fiber is to be connected.

In an embodiment the optical fiber has an overlength in the exit cavity which is from about 5 cm to about 10 m, such as from about 30 cm to about 2 m.

In an embodiment the optical fiber has an overlength in the exit cavity which is at least about the minimum length from the entrance end to the exit opening, such as at least about two times the minimum length from the entrance end to the exit opening, such as at least about five times the minimum length from the entrance end to the exit opening.

The exit cavity can have any shape. Advantageously the exit cavity has a length extending from its entrance end to its exit opening and a cross-sectional area which advantageously may be constant or even better be larger closer to the exit opening than it is closer to the entrance end. The cross-sectional area at or in a section adjacent to the entrance end is in one embodiment relatively small, but of a sufficient size to allow the optical fiber to pass there through, and the cross-sectional area in a section adjacent to the exit opening is advantageously relatively large to make space for the overlength of optical fiber. The relatively small cross-sectional area at or in a section adjacent to the entrance end ensures a safe guiding of the optical fiber without taking up an excessive amount of space which potentially could make the end-fitting unnecessarily bulky.

The optical fiber is advantageously not permanently fixed within the exit cavity. In an embodiment the optical fiber is temporally fixed within the exit cavity e.g. by being held in a loose gripping element, a click lock a screw lock or similar.

In an embodiment the entrance end of the exit cavity is arranged within the housing cavity—in this embodiment it is advantageous that the cross-sectional area at or adjacent to the entrance end is relatively small to ensure that none or only a minimum of the securing material in the housing cavity penetrates into the exit cavity.

In an embodiment the entrance end of the exit cavity is arranged outside the housing cavity such that the exit cavity comprises a section passing through the exit cavity e.g. in the form of a tube shaped exit cavity section—in this embodiment it is ensured that the optical fiber is not in contact with the securing material which is beneficial in situations where the securing material has a low elasticity or provides a permanently or a deforming press against the optical fiber.

In an embodiment the entrance end of the exit cavity is arranged in prolongation of the housing cavity. Where the optical fiber is less sensitive this construction may be the simpler choice because the exit cavity can simply be formed in a wall section of the end-fitting.

In an embodiment the optical fiber is fixed in the housing cavity, optionally by the securing material. This embodiment is in particular advantageous where the optical fiber is a part of a stress fiber sensor, such as a distributed stress fiber sensor.

In an embodiment the optical fiber is fixed in the housing cavity by a relatively elastic material, such as a material having a Durometer hardness of less than about 85 Shore A, such as from about 60 to about 80 shore A (ISO 7619). The durometer hardness is determined at 20° C.

In an embodiment the optical fiber is loosely applied in the housing cavity after the securing material has cured.

In an embodiment the end-fitting comprises a fiber guide unit arranged in the housing cavity and the optical fiber is passing through the fiber guide unit. The guide unit forms in one embodiment a part of the exit cavity. In another embodiment the guide unit is a separate unit.

Advantageously the end-fitting comprises an annular end-fitting body structure with a termination section comprising the housing cavity, a mounting flange and a narrow section—also referred to as a waist section—interconnecting the termination section and the mounting flange. The termination section comprises an annular shoulder adjacent to the narrow section. Preferably the exit opening is arranged at the annular shoulder. Thereby the exit opening or the lid/connector covering the exit opening is at least partly mechanically protected.

In an embodiment the assembly comprises a plurality of optical fibers for mounting to one or more processing systems or waveguide. The assembly preferably comprises 3 or more optical fibers, such as 4 or more optical fibers such as 5 or more optical fibers.

In principle the assembly can comprise as many optical fibers as desired. The optical fiber may be arranged as individual optical fibers or in clusters of two or more optical fibers in each cluster.

In an embodiment the assembly comprises from 2 to 20 optical fibers, such as from 3 to 16 optical fibers.

Advantageously the plurality of optical fibers is arranged outside the innermost sealing sheath. Thereby the optical fibers can exit the end-fitting via one or more exit cavities without passing through the innermost sealing sheath.

In an embodiment the end-fitting comprises a plurality of fiber exit cavities each with an entrance end and an exit opening through which the respective fibers can exit. Advantageously the respective optical fibers are applied in respective overlength in the respective exit cavities. The overlength of one optical fiber in an exit cavity can be equal to or be different from the overlength of another optical fiber an exit cavity (which may be equal or may differ from optical fiber/exit cavity. Where two or more optical fibers are applied in the same exit cavity the overlength of the optical fibers are advantageously equal to each other to ensure simple and safe coupling to a processing system.

The optical fiber is advantageously a part of a sensor system. The optical fiber can be any kind of optical fiber suitable for this purpose such as a silica optical fiber or a polymer optical fiber. Optical fibers for measuring strain, temperature and/or pressure are well known in the art and will not be described in detail herein. Advantageously the optical fiber comprises a plurality of gratings such as Fiber Bragg Gratings (FBG) which may be uniform or chirped.

In an embodiment the optical fiber is part of a distributed temperature fiber sensor.

In an embodiment the optical fiber is part of a distributed stress fiber sensor.

In an embodiment the optical fiber is part of a distributed pressure fiber sensor.

In an embodiment the optical fiber extends in the whole length of the unbonded flexible pipe. Depending on the length of the unbonded flexible pipe and the parameter or parameters which the optical fiber is adapted to determine, it may be a large advantage to have the optical fiber in the whole length of the unbonded flexible pipe.

In an embodiment the optical fiber extends in a length section of the unbonded flexible pipe adjacent to the end-fitting. Where the unbonded flexible pipe is a riser and the parameter or parameters to be determined are mainly relevant for being determined in a section adjacent to the end-fitting e.g. an uppermost end-fitting relatively close or above the water line, it is often advantageous to have the optical fiber only in that section of the unbonded flexible pipe, e.g. the uppermost section of the unbonded flexible pipe, thereby saving cost by having a shorter length of optical fiber.

BRIEF DESCRIPTION OF DRAWINGS

The invention will be explained more fully below in connection with a preferred embodiment and with reference to the drawings in which.

The figures are schematic and may be simplified for clarity. Throughout, the same reference numerals are used for identical or corresponding parts.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
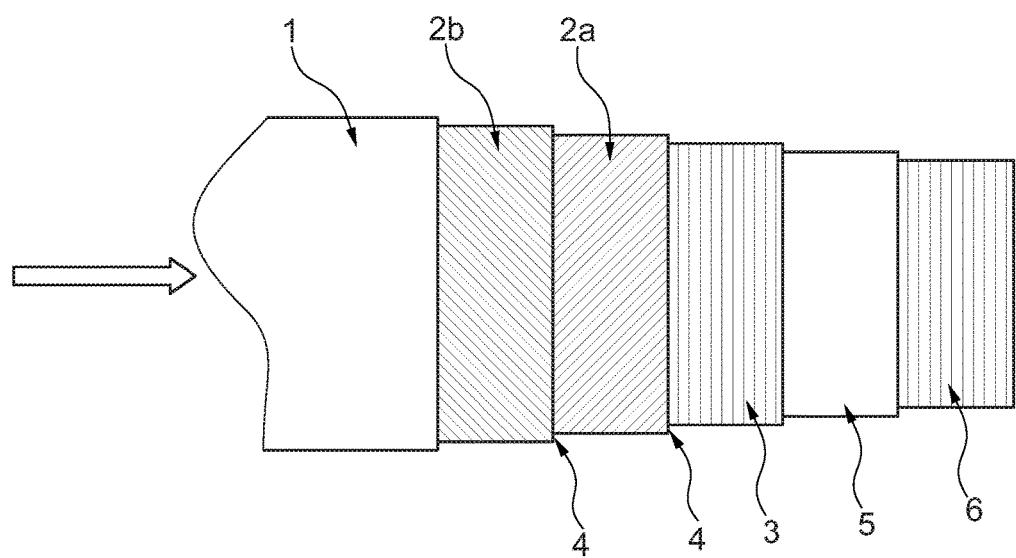
FIG. 1 is a schematic side view of an unbonded flexible pipe suitable for termination in an end-fitting to provide an assembly of the invention.

The flexible pipe e.g. a riser pipe shown in FIG. 1 is an example of a typically unbonded flexible pipe and comprises a liquid impervious inner sealing sheath 5 defining a bore as indicated with the bold arrow. The liquid impervious inner sealing sheath 5 can be of any polymer material suitable for forming such liquid impervious barrier. Examples of suitable polymer materials are high density polyethylene (HDPE), cross linked polyethylene (PEX), polyvinyldifluorid (PVDF) or polyamide (PA). The liquid impervious inner sealing sheath 5 has the purpose of preventing outflow of the fluid transferred in the bore of the pipe, indicated with the bold arrow. Inside the liquid impervious inner sealing sheath 5, the unbonded flexible pipe comprises an inner armor layer 6, called a carcass which is normally of metal, and has the main purpose of reinforcing the unbonded flexible pipe against collapse as described above. The carcass 6 is not liquid tight. On the outer side of the liquid impervious inner sealing sheath 5, the unbonded flexible pipe comprises a pressure armor layer 3 which is often of helically wound armor element(s) of metal or composite material, which is wound with a high angle to the center axis of the unbonded flexible pipe, such as an angle to the axis of the unbonded flexible pipe of about 70 degrees or more e.g. about 85 degrees. The pressure armor layer 3 is not liquid tight. In the metal armored unbonded flexible pipe it is generally desired that also the pressure armor is of metal.

Outside the pressure armor layer 3, the unbonded flexible pipe comprises two cross wound tensile armor layers 2a, 2b wound from elongate armor elements e.g. of composite material and/or metal. For example the elongate armoring elements on the innermost tensile armor layer 2a are wound with a winding degree of about 55 degrees or less to the axis of the unbonded flexible pipe in a first winding direction and the outermost tensile armor layer 2b is wound with a winding degree of about 60 degrees or less, such as between about 20 and about 55 degrees to the axis of the unbonded flexible pipe in a second winding direction, which is the opposite direction to the first winding direction. The two armor layers with such opposite winding direction are normally referred to as being cross wound. The unbonded flexible pipe further comprises a liquid impervious outer sealing sheath 1 which protects the armor layers mechanically and against ingress of sea water. As indicated with the reference number 4, the unbonded flexible pipe preferably comprises anti-friction layers between the armor layers 3, 2a, 2b.

Each of the layers can comprise one or more optical fibers which form part of one or more sensors. Advantageously the optical fiber is arranged in a layer outside the innermost sealing sheath 5 in order to ensure access to the end-fitting without penetration or weakening of the innermost sealing sheath.

In an embodiment the one or more optical fibers are arranged in one or more tensile armor layers. In an embodiment the one or more optical fiber are arranged in the unbonded flexible pipe as described in co-pending application PCT/DK2013/050064.

Figure 2:
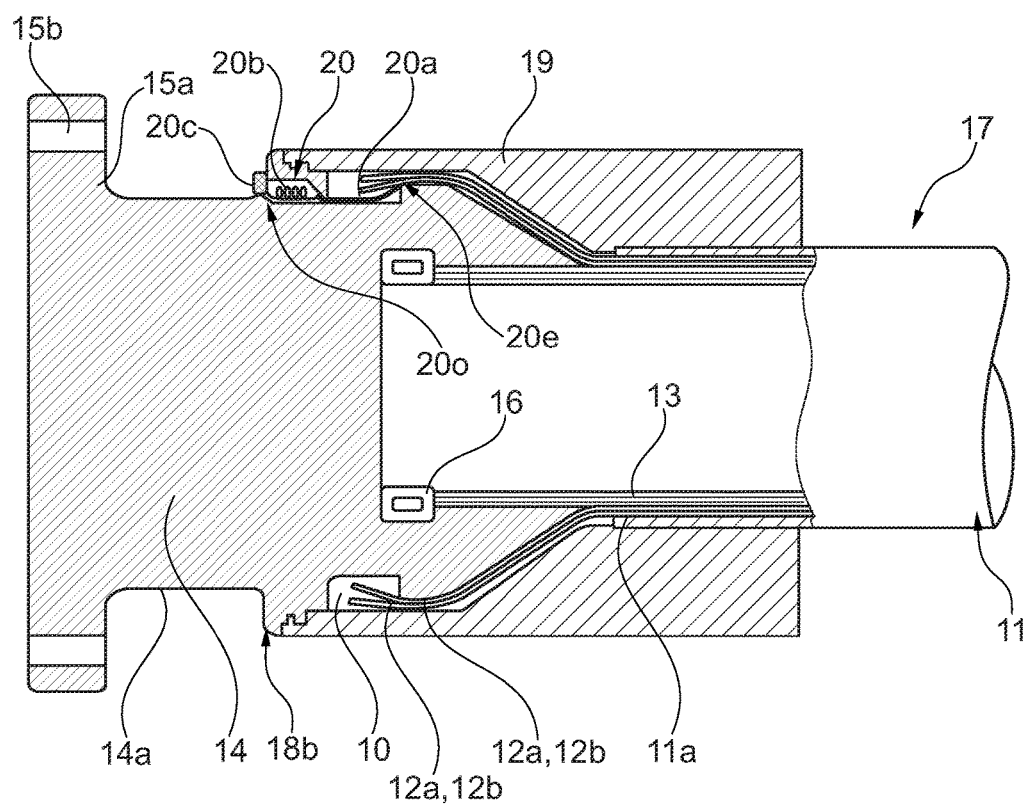
FIG. 2 is a schematic cross-sectional side view of an assembly of a flexible pipe and an end-fitting of the invention, wherein the unbonded flexible pipe comprises an optical fiber which has an overlength in a fiber exit cavity of the end-fitting.

FIG. 2 shows an assembly of a flexible pipe 17 and an end-fitting 18 of the invention. The unbonded flexible pipe 17 comprises an outer sealing sheath 11 surrounding two cross wound tensile armor layers 12a, 12b. Inside the cross wound tensile armor layers 12a, 12b, the pipe comprises a number of other layers 13, including at least a liquid impervious inner sealing sheath and preferably additional layers which are usually present in unbonded flexible pipes e.g. as described above or as described in "Recommended Practice for Flexible Pipe", ANSI/API 17 B, fourth Edition, July 2008, and the standard "Specification for Unbonded Flexible Pipe", ANSI/API 17J, Third edition, July 2008. The layers 13 inside the cross wound tensile armor layers 12a, 12b will usually be terminated individually, as shown schematically in the drawing with the terminating unit 16.

The end-fitting 18 comprises an annular end-fitting body structure with a termination section 18a comprising the housing cavity 10, an end-fitting body 14 with a narrow section 14a and a mounting flange 15a with holes 15b for mounting to another part, e.g. another end-fitting or to a platform or a vessel. The end-fitting 18 further comprises an annular outer casing 19. A housing cavity 10 is formed between the end-fitting body 14 and the outer casing 19. The outer sealing sheath 11 is terminated at a termination point 11a in well known manner. The tensile armor elements of the tensile armor layers 12a, 12b are terminated and secured by securing material in the housing cavity 10 of said end-fitting 18. The end-fitting 18 has an annular shoulder 18b.

The unbonded flexible pipe 17 comprises an optical fiber arranged in one of its layer outside the innermost sealing sheath. The end-fitting 18 comprises a fiber exit cavity 20 with an entrance end 20e and an exit opening 20o through which the fiber 20b can exit, the fiber is applied in an overlength in said fiber exit cavity 20. The end-fitting 18 comprises a lid 20c covering the exit opening 20o. The optical fiber 20b is terminated in the exit cavity 20 in that it is at least temporally fixed to the lid 20c. The end-fitting 18 comprises a fiber guide unit 20a arranged in the housing cavity 10 and the optical fiber is passing through said fiber guide unit 20a.

Figure 3:
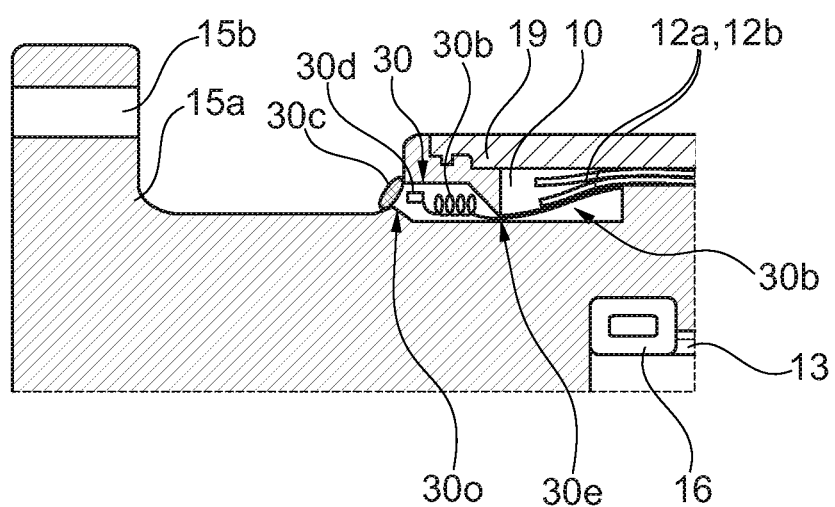
FIG. 3 is a schematic cross-sectional side view of a section of another assembly of a flexible pipe and an end-fitting of the invention, wherein the unbonded flexible pipe comprises an optical fiber which has an overlength in a fiber exit cavity of the end-fitting.

FIG. 3 is a schematic cross-sectional side view of a section of another assembly of a flexible pipe and an end-fitting of the invention, wherein only a section of the end-fitting and part of the tensile armor layers 12a, 12b and an optical fiber 30b are shown.

The assembly of FIG. 3 corresponds to the assembly of FIG. 2 with the exception that the optical fiber 30b passes through the housing cavity 10 where it is fixed by the securing material. From the housing cavity 10 the optical fiber 30b passes into the fiber exit cavity 30 via the entrance end 30e. The fiber is terminated within the exit cavity 30 and is mounted with a connector 30d for fast and simple mounting to a processing system. A lid 30c covers the exit cavity 30 at its exit opening 30o to protect the fiber against dust and dirt and simultaneously ensuring a mechanical protection. In use the lid 30c can be removed and the fiber connector 30d connected to the fiber 30b can be withdrawn for connection to a not shown processing system.

Figure 4:
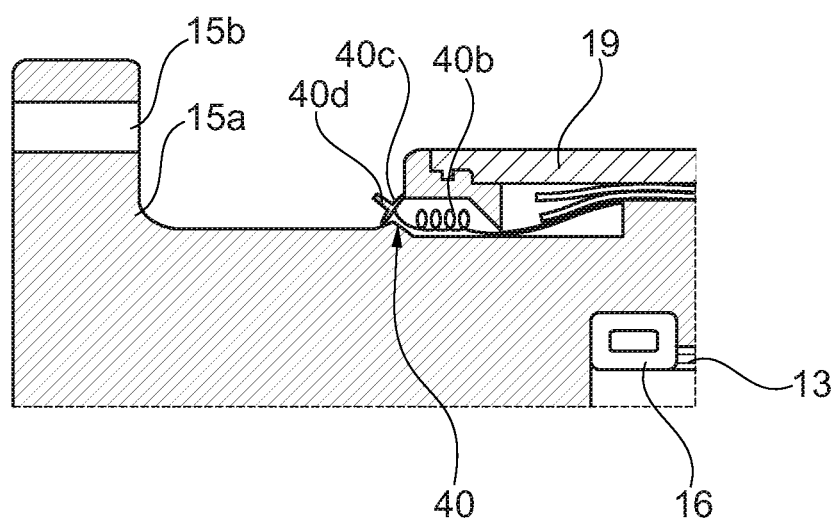
FIG. 4 is a schematic cross-sectional side view of a section of another assembly of a flexible pipe and an end-fitting of the invention, wherein the unbonded flexible pipe comprises an optical fiber which has an overlength in a fiber exit cavity of the end-fitting.

FIG. 4 is a schematic cross-sectional side view of a section of another assembly of a flexible pipe and an end-fitting of the invention, wherein only a section of the end-fitting and part of the tensile armor layers 12a, 12b and an optical fiber 40b are shown.

The assembly of FIG. 4 also corresponds to the assembly of FIG. 2 with the exception that the optical fiber 40b passes through the housing cavity 10 where it is fixed by the securing material. From the housing cavity 10 the optical fiber 40b passes into the fiber exit cavity 40 via the entrance end 40e. The fiber 40b is applied in an overlength with the exit cavity 40 and is terminated at the exit opening 40o where it is mounted to a connector 40d which is temporally or permanently mounted to a lid 40c covering the exit opening of the exit cavity 40. In use the connector 40d or the connector 40d with the lid 40c can be removed and the fiber connector 40d connected to the fiber 40b can be withdrawn for easy connection to a not shown processing system.

Figure 5:
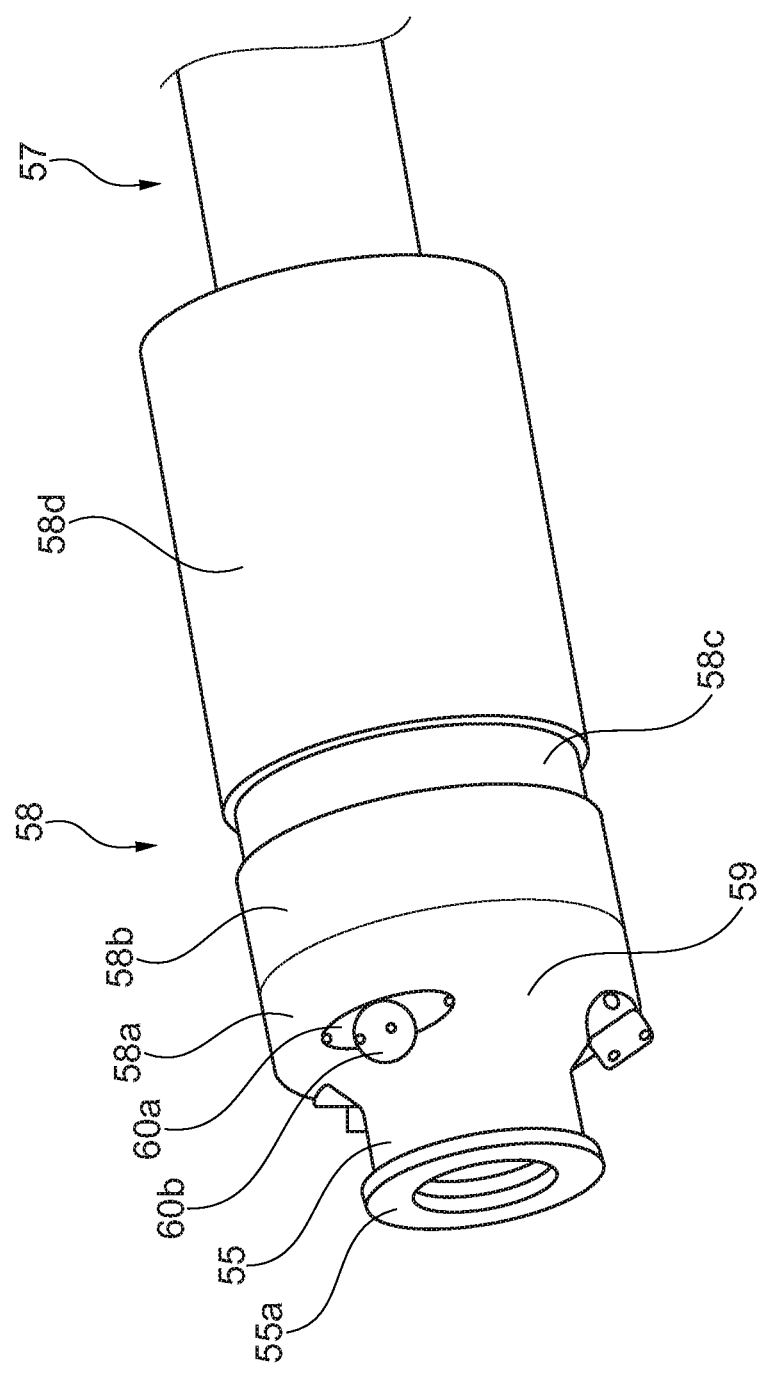
FIG. 5 is a perspective view of an assembly comprising an end-fitting and a flexible pipe

The assembly shown in FIG. 5 comprises an unbonded flexible pipe 57 and an end-fitting 58 comprising a number of end-fitting units 58a, 58b, 58c, 58d which are connected for terminating the not shown individual layers of the unbonded flexible pipe 57.

The end-fitting 58 comprises a narrow section 55 and a mounting flange 55a The end-fitting 58 has an annular shoulder 59. The end-fitting 58 comprises not shown exit cavities which each are covered with a lid 60a with a fiber termination 60b to which one or more not shown fibers are fixed. The not shown fibers are arranged in one or more layers of the unbonded flexible pipe 57 and pass through a housing cavity where tensile armor elements are terminated and further through the exit cavities where they are applied in an overlength, such that the fiber terminations connected to the optical fibers can be removed from the respective lids 60a to a desired distance from the end-fitting because of the overlength of fibers in the exit cavities.

Figure 5A:
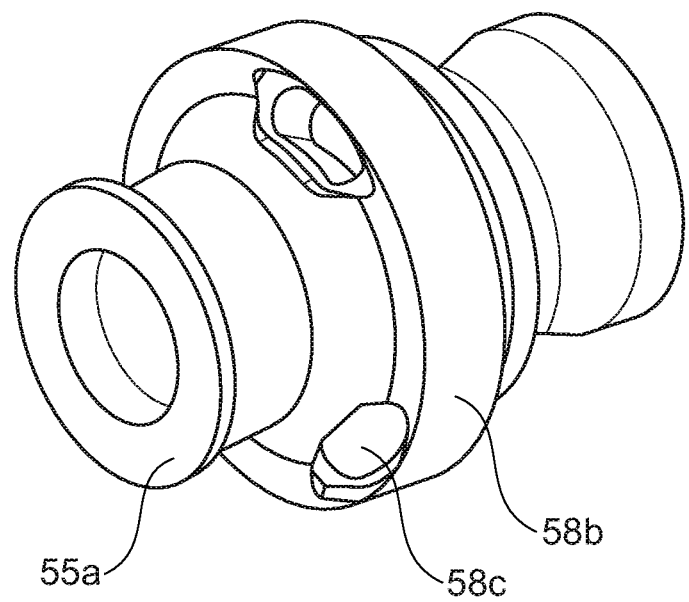
FIG. 5a is a perspective view of an element of the end-fitting shown in FIG. 5.

FIG. 5a shows an element 58b of the end-fitting 58 of FIG. 5 where the exit cavities 58c are shown.

Figure 6:
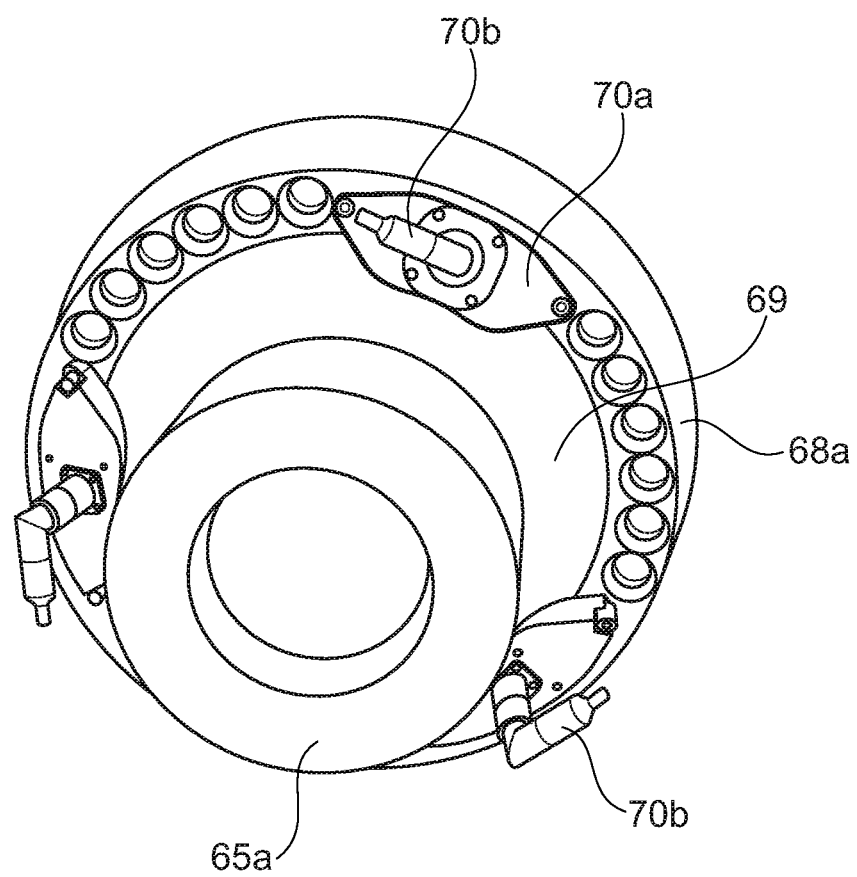
FIG. 6 is a slightly perspective view of an end-fitting mounted to a not shown unbonded flexible pipe.

FIG. 6 shows an end-fitting mounted to a not shown unbonded flexible pipe. The end-fitting is seen from the mountain flange 65a end. The end-fitting comprises a number of end-fitting units 58a where only one is shown.

The end-fitting has an annular shoulder 69. The end-fitting comprises not shown exit cavities which each are covered with a lid 70a with a fiber connector 70b to which one or more not shown fibers are fixed. The not shown fibers are arranged in one or more layers of the unbonded flexible pipe and pass through a housing cavity where tensile armor elements are terminated and further through the exit cavities where they are applied in an overlength, such that the fiber connectors connected to the optical fibers can be removed from the respective lids 70a to a desired distance from the end-fitting thanks to the overlength of fibers in the exit cavities.

Figure 7:
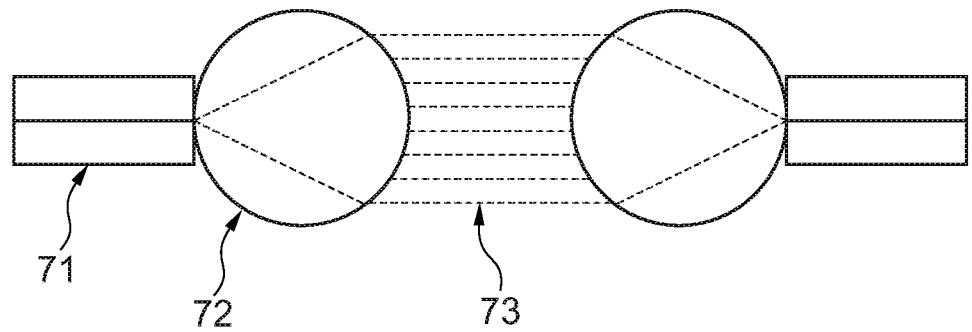
FIG. 7 is a schematic side view of ferrules and lenses of a pair of fiber connectors illustrating the light beam connection.

FIG. 7 is a schematic side view of ferrules 71 connected to spherical lenses 72 of a pair of fiber connectors illustrating the light beam connection in the form of a collimated light beam connection 73 between the optical fiber of the assembly and a light wave guide of a not shown processing system.

Figure 8:
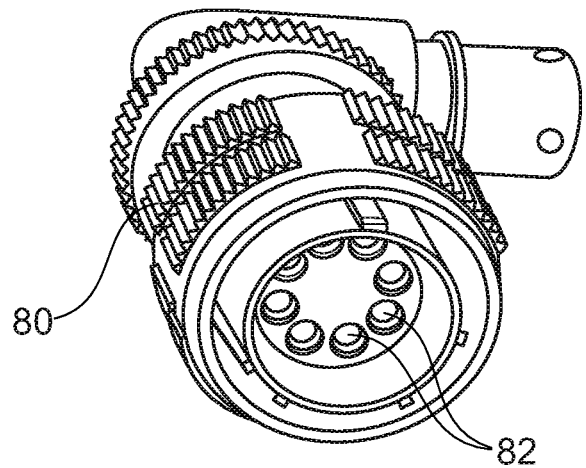
FIG. 8 is a perspective view of a fiber connector arranged to connect 8 optical fibers.

FIG. 8 shows a fiber connector 80 for connecting 8 optical fibers via spherical lenses 82. The fibers are not yet mounted, but can in a simple way be mounted in respective ferrules in the connector. The spherical lenses 82 ensure a simple alignment of the light beams.

Some preferred embodiments have been shown in the foregoing, but it should be stressed that the invention is not limited to these, but may be embodied in other ways within the subject-matter defined in the following claims.

What is claimed is:

1. An assembly of an unbonded flexible pipe and an end-fitting, wherein the flexible pipe comprises:
    at least one optical fiber for mounting to a processing system or another waveguide, and
    a plurality of layers including an innermost sealing sheath and an outermost armor layer, the at least one optical fiber being arranged outside said innermost sealing sheath, said outermost armor layer being terminated and secured by securing material in a housing cavity of said end-fitting,
    wherein the end-fitting comprises a fiber exit cavity with an entrance end and an exit opening through which the fiber can exit, the fiber being applied in an overlength in said fiber exit cavity, and
    wherein the fiber exit cavity is separated from the housing cavity by a wall.

2. The assembly as claimed in claim 1, wherein the optical fiber has the overlength in said exit cavity which is at least about 5 cm.

3. The assembly as claimed in claim 1, wherein the optical fiber is terminated in said fiber exit cavity.

4. The assembly as claimed in claim 1, wherein the optical fiber has a fiber end mounted to a connector.

5. The assembly as claimed in claim 4, wherein the connector is applied loosely in the exit cavity.

6. The assembly as claimed in claim 1, wherein the end-fitting comprises a lid at least partly covering said exit opening.

7. The assembly as claimed in claim 1 wherein the optical fiber has a fiber end mounted to a connector that is connected to a lid by a releasable lock.

8. The assembly as claimed in claim 1 wherein a lid covers said exit opening with the exception of a fiber hole through which the optical fiber is passing, the optical fiber has a fiber end mounted to a connector, the connector is releasably connected to said lid.

9. The assembly as claimed in claim 1 wherein a lid covers said exit opening with the exception of a fiber hole through which a connector mounted to said optical fiber is passing, the connector is releasably connected to said lid.

10. The assembly as claimed in claim 1 wherein the optical fiber has a fiber end mounted to a connector, which connector forms part of or constitutes a lid.

11. The assembly as claimed in claim 1 wherein the optical fiber is fixed in said housing cavity, optionally by said securing material.

12. The assembly as claimed in claim 1 wherein the optical fiber is loosely applied in said housing cavity.

13. The assembly as claimed in claim 1 wherein said end-fitting comprises a fiber guide unit arranged in said housing cavity, said optical fiber is passing through said fiber guide unit.

14. The assembly as claimed in claim 1 wherein said end-fitting comprises an annular end-fitting body structure with a termination section comprising said housing cavity, a mounting flange and a narrow section connecting said termination section and said mounting flange, the termination section comprises an annular shoulder adjacent to the narrow section.

15. The assembly as claimed in claim 1 wherein said assembly comprises a plurality of optical fibers for mounting to one or more processing systems or waveguides.

16. The assembly as claimed in claim 1 wherein said assembly comprises a plurality of optical fibers, said plurality of optical fibers are arranged outside said innermost sealing sheath.

17. The assembly as claimed in claim 1 wherein the end-fitting comprises a plurality of fiber exit cavities each with an entrance end and an exit opening through which the respective fibers can exit, the respective optical fibers are applied in respective overlengths in said respective exit cavities.

18. The assembly as claimed in claim 1 wherein the at least one optical fiber is part of a distributed temperature fiber sensor.

19. The assembly as claimed in claim 1 wherein the at least one optical fiber is part of a distributed stress fiber sensor.

20. The assembly as claimed in claim 1 wherein the at least one optical fiber is part of a distributed pressure fiber sensor.

* * * * *